(12) United States Patent
Campos et al.

(10) Patent No.: US 11,039,229 B2
(45) Date of Patent: Jun. 15, 2021

(54) SYSTEMS AND METHODS FOR COHERENT OPTICS RANGING AND SENSING

(71) Applicant: CABLE TELEVISION LABORATORIES, INC, Louisville, CO (US)

(72) Inventors: Luis Alberto Campos, Superior, CO (US); Zhensheng Jia, Superior, CO (US); Matthew Schmitt, Pleasanton, CA (US); Curtis Dean Knittle, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/116,300

(22) Filed: Aug. 29, 2018

(65) Prior Publication Data

US 2019/0069055 A1  Feb. 28, 2019

Related U.S. Application Data

(60) Provisional application No. 62/551,456, filed on Aug. 29, 2017.

(51) Int. Cl.
   *H04J 14/00*   (2006.01)
   *H04Q 11/00*   (2006.01)
   (Continued)

(52) U.S. Cl.
   CPC ....... *H04Q 11/0067* (2013.01); *H04B 10/505* (2013.01); *H04B 10/61* (2013.01);
   (Continued)

(58) Field of Classification Search
   CPC ............... H04Q 11/0067; H04J 3/0682; H04J 14/0221; H04J 14/0249; H04J 14/00;
   (Continued)

(56) References Cited

U.S. PATENT DOCUMENTS 5,299,044 A * 3/1994 Mosch ................. H04B 10/272
                                                          398/32
5,327,277 A * 7/1994 Van Der Plas ...... H04B 10/272
                                                         398/158

(Continued)

OTHER PUBLICATIONS

Vacondio et al, Flexible TDMA access optical networks enabled by burst mode software, Oct. 2013, ECOC, All Document. (Year: 2013).*

*Primary Examiner* — Dibson J Sanchez
(74) *Attorney, Agent, or Firm* — Armstrong Teasdale LLP

(57) ABSTRACT

An optical network communication system utilizes a passive optical network (PON) and includes an optical line terminal (OLT) having a downstream transmitter and an upstream receiver, and an optical network unit (ONU) having a downstream receiver and an upstream transmitter. The downstream transmitter is configured to provide a coherent downlink transmission, and the downstream receiver is configured to obtain one or more downstream parameters from the coherent downlink transmission. The system further includes a long fiber configured to carry the coherent downlink transmission between the OLT and the ONU. The ONU is configured to communicate to the OLT a first upstream ranging request message, the OLT is configured to communicate to the ONU a first downstream acknowledgement in response to the upstream first ranging request message, and the ONU is configured to communicate to the OLT a second upstream ranging request message based on the first downstream acknowledgement.

17 Claims, 9 Drawing Sheets

(51) Int. Cl.
  *H04J 14/02* (2006.01)
  *H04B 10/61* (2013.01)
  *H04B 10/50* (2013.01)
  *H04J 3/06* (2006.01)
  *H04B 10/564* (2013.01)
  *H04B 10/572* (2013.01)

(52) U.S. Cl.
  CPC ........ *H04J 3/0682* (2013.01); *H04J 14/0221* (2013.01); *H04B 10/564* (2013.01); *H04B 10/572* (2013.01); *H04J 14/00* (2013.01); *H04J 14/0249* (2013.01)

(58) Field of Classification Search
  CPC ..... H04J 3/1694; H04B 10/61; H04B 10/505; H04B 10/564; H04B 10/572
  USPC .................................................... 398/43–103
  See application file for complete search history.

(56) References Cited

U.S. PATENT DOCUMENTS

| | | | | |
|---|---|---|---|---|
| 5,619,504 | A * | 4/1997 | Van Grinsven | H04J 3/0682 370/347 |
| 5,926,478 | A * | 7/1999 | Ghaibeh | H04L 12/2801 370/395.51 |
| 6,262,997 | B1 * | 7/2001 | Quayle | H04J 3/0682 370/503 |
| 2004/0246989 | A1 * | 12/2004 | Brolin | H04J 3/1694 370/466 |
| 2007/0127923 | A1 * | 6/2007 | Dalton | H04Q 11/0067 398/71 |
| 2007/0237189 | A1 * | 10/2007 | Miguel | H04Q 11/0067 398/118 |
| 2008/0089699 | A1 * | 4/2008 | Li | H04B 10/07957 398/197 |
| 2009/0016726 | A1 * | 1/2009 | Suzuki | H04B 10/0793 398/79 |
| 2009/0080891 | A1 * | 3/2009 | Kazawa | H04J 3/0682 398/79 |
| 2010/0239247 | A1 * | 9/2010 | Kani | H04J 14/0282 398/41 |
| 2011/0150499 | A1 * | 6/2011 | Sala | H04L 12/413 398/154 |
| 2011/0229140 | A1 * | 9/2011 | Ohlen | H04B 10/272 398/79 |
| 2011/0236017 | A1 * | 9/2011 | Ohlen | H04J 14/0282 398/34 |
| 2012/0121253 | A1 * | 5/2012 | Zhang | H04Q 11/0067 398/25 |
| 2012/0251122 | A1 * | 10/2012 | Grobe | H04J 14/0246 398/95 |
| 2013/0336655 | A1 * | 12/2013 | Grobe | H04J 14/0246 398/67 |
| 2014/0233954 | A1 * | 8/2014 | Lee | H04J 14/0246 398/72 |
| 2015/0063812 | A1 * | 3/2015 | Dove | H04B 10/40 398/67 |
| 2015/0098704 | A1 * | 4/2015 | Gao | H04J 14/0246 398/68 |
| 2016/0099777 | A1 * | 4/2016 | Liu | H04B 10/614 398/159 |
| 2016/0173192 | A1 * | 6/2016 | Wilson | H04Q 11/0067 398/25 |
| 2017/0170898 | A1 * | 6/2017 | Fu | H04B 10/07957 |

* cited by examiner

SYSTEMS AND METHODS FOR COHERENT OPTICS RANGING AND SENSING

CROSS REFERENCE TO RELATED APPLICATIONS

This application claims the benefit of and priority to U.S. Provisional Patent Application Ser. No. 62/551,456, filed Aug. 29, 2017, which is incorporated herein by reference in its entirety.

BACKGROUND

The field of the disclosure relates generally to fiber communication networks, and more particularly, to access networks capable of transmitting coherent optical signals.

Fiber-to-the-premise (FTTP, also referred to as fiber-to-the-home, or FTTH) based access networks have been widely deployed in many regions of the world. Increasing demand for high-speed data and video services is presently driving growth in access bandwidth requirements, up to gigabits per second (Gb/s) for residential offerings and multi-Gb/s for business. Conventional FTTP network architectures utilize a passive optical network (PON), for example, a Gigabit passive optical network (GPON) within ITU-T, or an Ethernet passive optical network (EPON) within IEEE. PON can be point-to-multipoint (P2MP), and is often an economical alternative to point-to-point (P2P) Ethernet for moderate to large populations. There are two standards organizations that define PON standards: (1) ITU-T defines GPON (2.5 Gb/s downstream, 1.25 Gb/s upstream), XG-PONI (10 Gb/s downstream, 2.5 Gb/s upstream), and XGS-PON (10 Gb/s upstream and downstream); and (2) IEEE defines 1G-EPON (1 Gb/s upstream and downstream), and 10G-EPON (10 Gb/s upstream and downstream).

GPON and EPON have some technical differences in terms of signal encapsulation and dynamic bandwidth allocation, but both PON types are capable of carrying data over fiber through a passive optical network all the way from an optical hub to a customer premise. Both PON types use baseband digital signaling over the fiber to carry information. Some conventional P2MP optical communication systems utilize non-coherent intensity modulated direct detection signals transmitted over a PON technology infrastructure.

Cable operators now regularly offer Gb/s service to residential offerings, and access bandwidth requirements therefrom are expected to grow to multi-Gb/s speeds in response to increasing 4K/8K video streaming, proliferation of cloud computing, "big data," social media, Internet of Things (IoT), and mobile data delivery. Conventional wired networks that are based on PON access technologies have become a dominant architecture to meet such high-capacity demand for end users. Increasingly, PONS are expected to evolve to provide higher per-subscriber data rates and wider coverage of services and applications, while at the same time minimizing capital expenditure (CAPEX) and operating expenditure (OPEX) costs, and also increasing reconfigurable capability for scalable solutions.

As capacity demand increases and coaxial based transport (e.g., hybrid fiber coaxial (HFC) networks) are unable to meet this demand, migration to FTTP infrastructures is expected to increase significantly. However, a smooth transition to FTTP has proven difficult, and frequently has not been cost effective.

Conventional PON systems are typically dedicated for business services, but the available fiber infrastructure is not well-suited for connectivity to home residences/premises. PON architectures typically split from 1-to-32 end devices, in a given fiber network serving area. Residential fiber node serving areas, however, were mostly installed with only 6-8 fibers per node, and often today only have 2 fiber strands available due to present fiber repurposing practices. A typical PON system though, would require 16 available fibers for implementation in a conventional legacy serving area. Thus, most conventional PON infrastructures, having only 2 fibers available, are unable to transition to legacy serving areas requiring 16 available fibers.

Given this limited fiber availability, some conventional system architectures share individual fibers among several services and many transmitters, however, most conventional systems are limited to one service/transmitter per individual fiber. In systems having multiple services on a fiber, each service may operate using one or more wavelengths, and each such wavelength may be dedicated to transport traffic from one or many transmitters. Accordingly, within this shared environment, it is desirable to create next-generation PON systems that are better able to manage transmission parameters for optimal transport and coexistence. With respect to conventional point-to-multipoint (P2MP) non-coherent PON systems, which typically utilize a protocol for uplink access, such new PON systems must further consider that address wavelengths will typically be available in the same servicing segments, and therefore management of transmission parameters will be even more necessary.

Conventional non-coherent optic systems typically implement On-Off Keying which enables these conventional systems to utilize low complexity receivers. Such low complexity receivers though, generally do not consider the precise wavelength of each transmitter, and therefore wavelength shifting is not typically considered a significant issue unless wavelength multiplexing is also implemented. In a two-level On-Off Keying system successive bursts may be received at different power levels, and the burst-by-burst power level variation becomes more significant in four-level PAM4 systems. As the system complexity increases, such as with coherent optical network systems having modulation orders higher than QPSK, these power and wavelength changes can have a critical impact on system operation. Furthermore, the power and wavelength variations may become more pronounced when transmitters are located in a harsh outdoor environment, as opposed to a controlled indoor ("friendly") environment.

FIG. 1 is a schematic illustration of a conventional coherent optical link 100 for a coherent optical network system (not separately shown). As illustrated in FIG. 1, link 100 represents a unidirectional coherent optical link, and includes a transmitter 102 and a receiver 104 in operable communication with each other over a fiber 106. In this example, transmitter 102 is a coherent transmitter, and includes an optical source 108 and an IQ modulator 110. IQ modulator 110, for example, is configured to receive input data 112, modulate the signal from optical source 108 with input data 112, and transmit the modulated data onto fiber 106. In this example, input data 112 includes I-data and Q-data from each of an X-polarization and a Y-polarization (i.e., $I_x$, $Q_x$, $I_y$, $Q_y$). Similarly, receiver 104 is a coherent optical receiver, and includes an optical local oscillator 114, an optical receiver module 116, and an optical hybrid unit 118 in operable communication with fiber 106 and disposed between optical local oscillator 114 and optical receiver module 116. In this example, receiver 104 further includes a signal processor 120 configured to deliver output data 122 according to the respective I/Q polarization distributions of input data 112.

Link 100, however, is representative only of a relationship between a single transmitter/receiver pair. In the downstream direction, this general link may be sufficient to represent the link between a receiver of an optical network unit (ONU) in communication with a single transmitter of an optical line terminal (OLT), such as may be seen in a conventional point-to-point (P2P) optical system. However, in the upstream direction, a single receiver of the OLT may receive subsequent transmissions (e.g., time division multiple access (TDMA) transmission) and, in some cases, simultaneous transmissions (described further below) from multiple ONU transmitters, and the one-size-fits-all architecture of link 100 is not able to sufficiently address the more complex considerations experienced within a P2MP optical system.

SUMMARY

In an embodiment, an optical network communication system utilizes a passive optical network (PON) and includes an optical line terminal (OLT) having a downstream transmitter and an upstream receiver. The downstream transmitter is configured to provide a coherent downlink transmission. The system further includes at least one optical network unit (ONU) having a downstream receiver and an upstream transmitter. The downstream receiver is configured to obtain one or more downstream parameters from the provided coherent downlink transmission. The system further includes a long fiber configured to carry the coherent downlink transmission between the OLT and the at least one ONU. The at least one ONU is configured to communicate to the OLT a first upstream ranging request message, the OLT is configured to communicate to the at least one ONU a first downstream acknowledgement in response to the upstream first ranging request message, and the at least one ONU is configured to communicate to the OLT a second upstream ranging request message based on the first downstream acknowledgement.

A method of ranging by an optical network unit of a coherent passive optical network (PON) is provided. The method includes steps of scanning the PON for a valid downlink channel from an optical line terminal (OLT) of the PON, detecting a contention transmit opportunity from the valid downlink channel, transmitting a first coarse ranging request message to the OLT during a contention window of the contention transmit opportunity, receiving a first acknowledgement message from the OLT in response to the first coarse ranging request message, modifying an uplink transmission based on first adjustment instructions included with the received first acknowledgement message, sending a first fine adjustment request message to the OLT during a dedicated time interval indicated with the received first acknowledgement message, and adjusting the uplink transmission based on second adjustment instructions included with a second acknowledgement message received from the OLT in response to the first fine adjustment request message.

BRIEF DESCRIPTION

These and other features, aspects, and advantages of the present disclosure will become better understood when the following detailed description is read with reference to the accompanying drawings in which like characters represent like parts throughout the drawings, wherein.

Figure 4B:
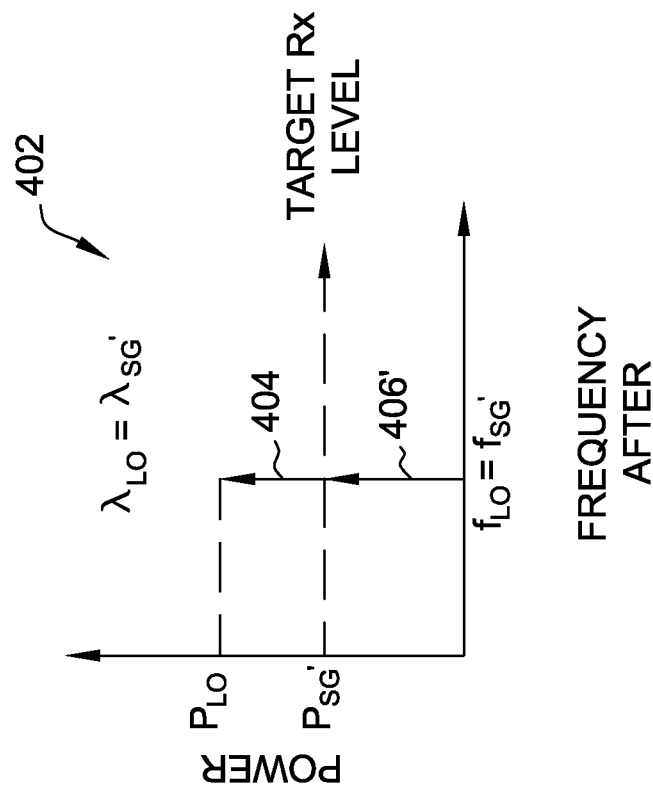
Figure 4A:
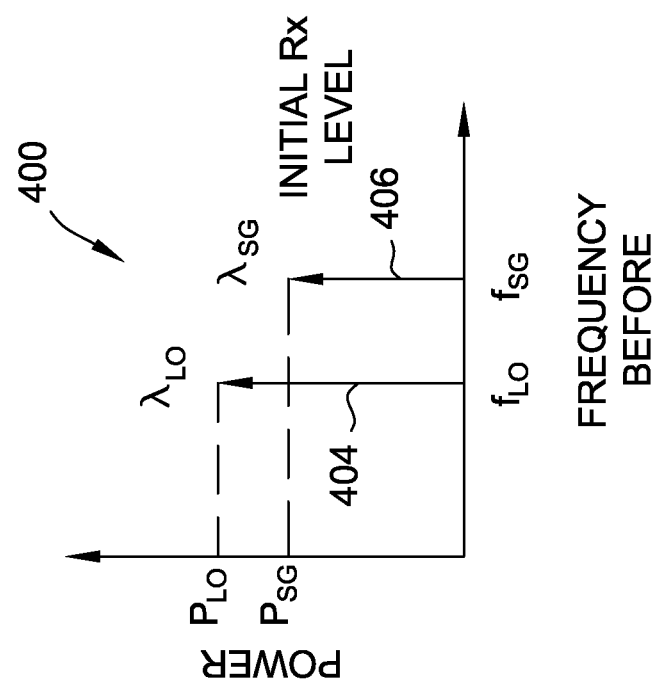

FIGS. 4A-B are graphical illustrations depicting a pre-adjustment effect and a post-adjustment effect, respectively, in accordance with an embodiment.

Figure 5A:
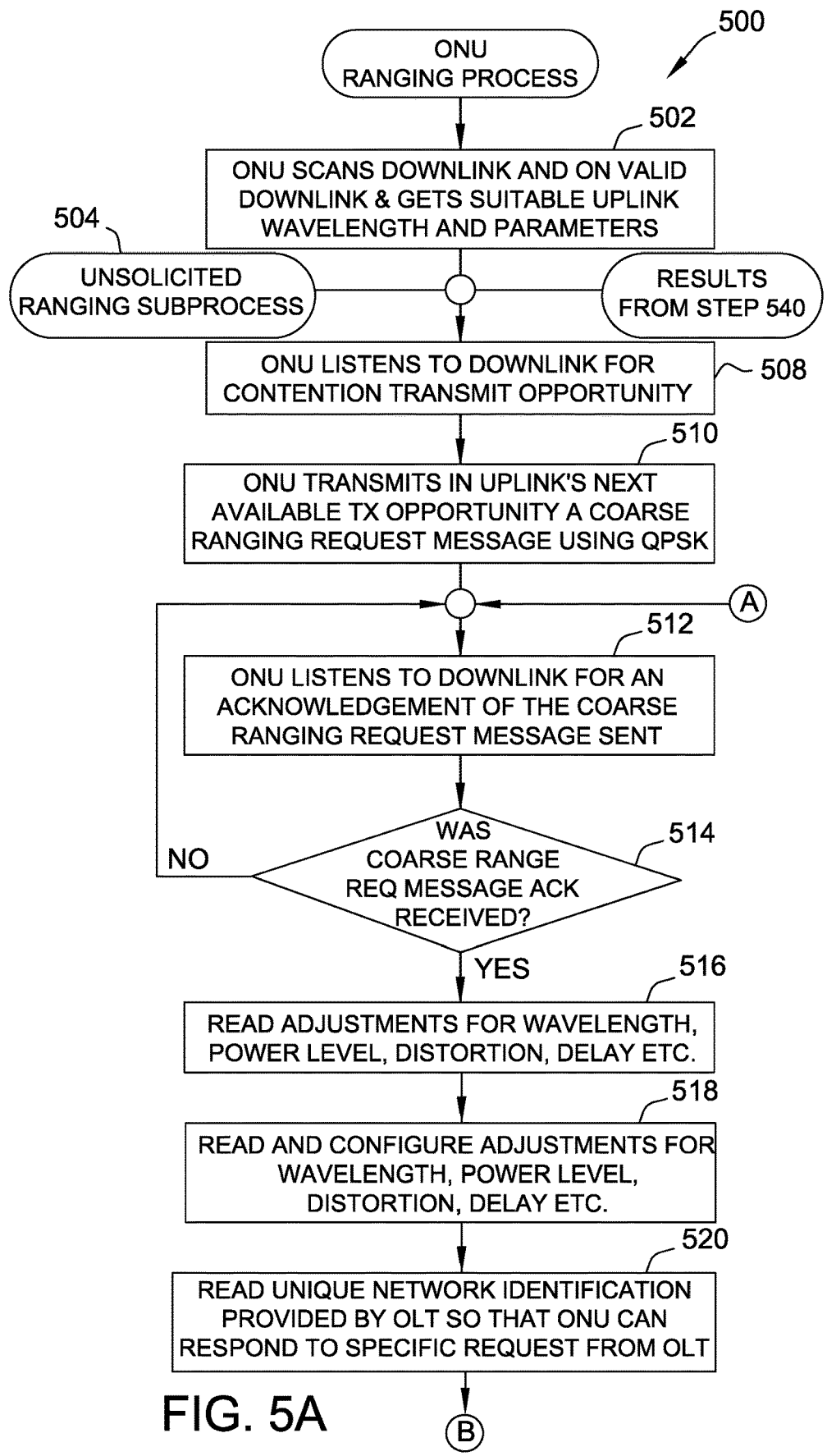
Figure 5B:
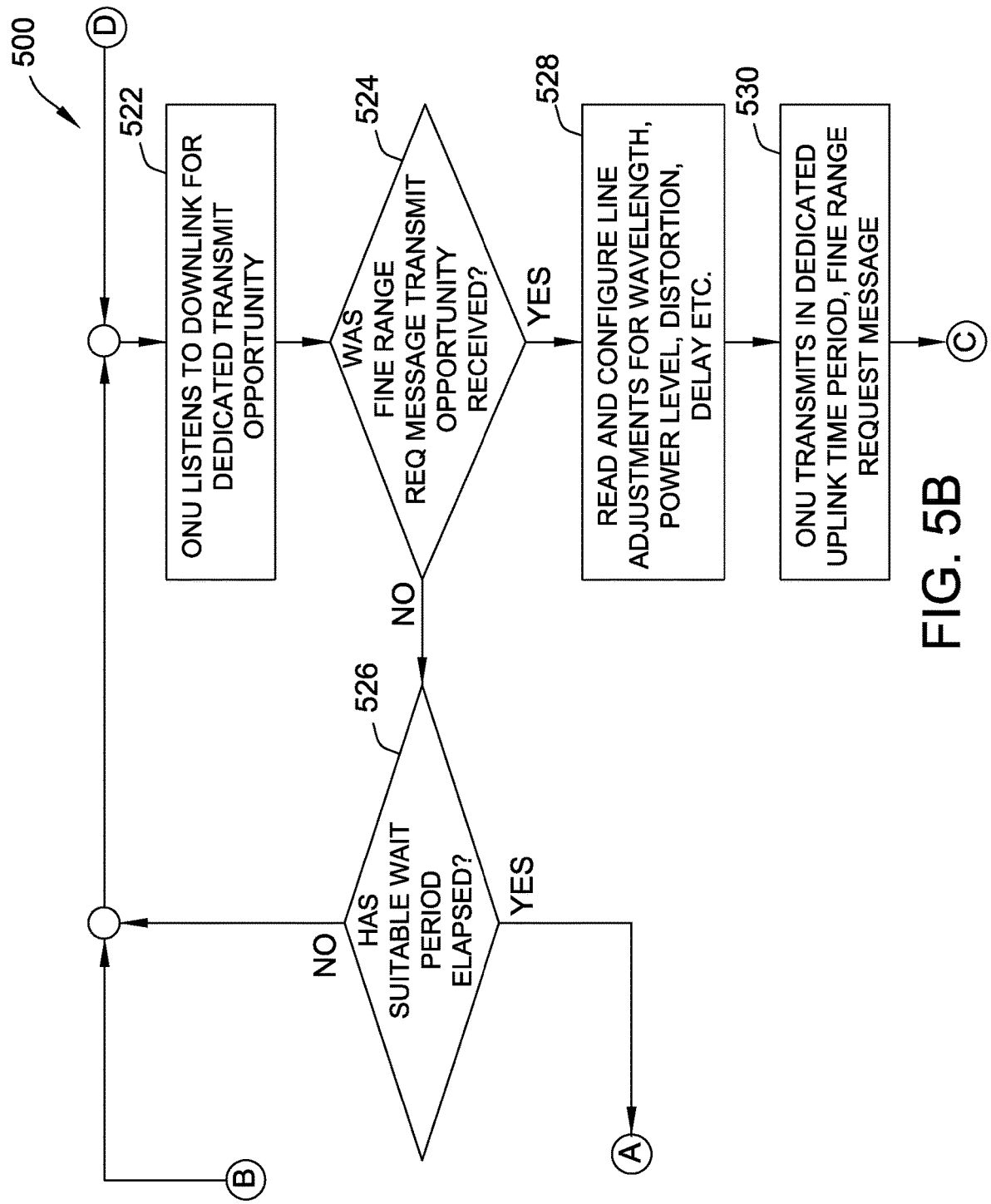
Figure 5C:
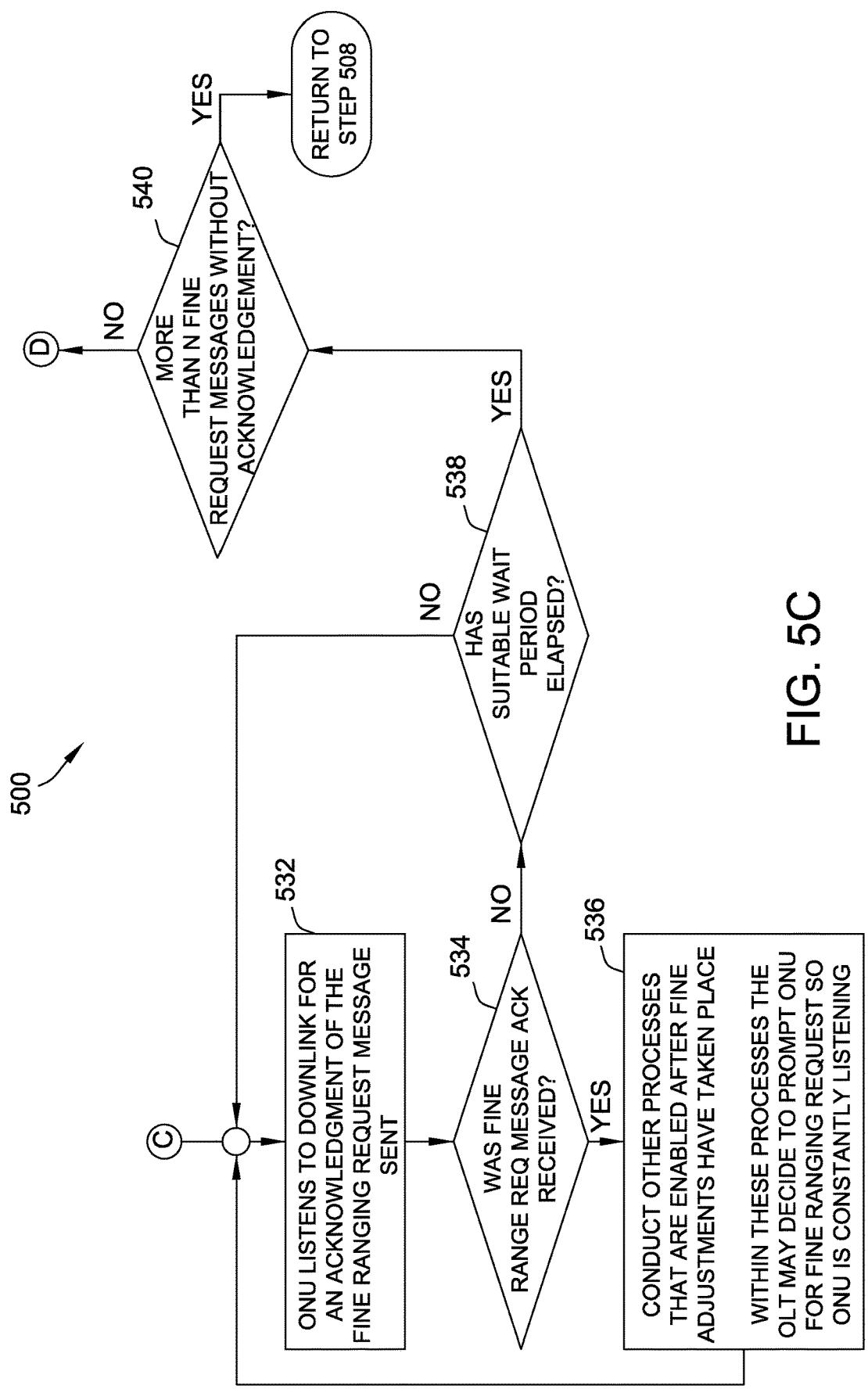

FIGS. 5A-5C illustrate a flow diagram for an optical network unit ranging process, in accordance with an embodiment.

Figure 6A:
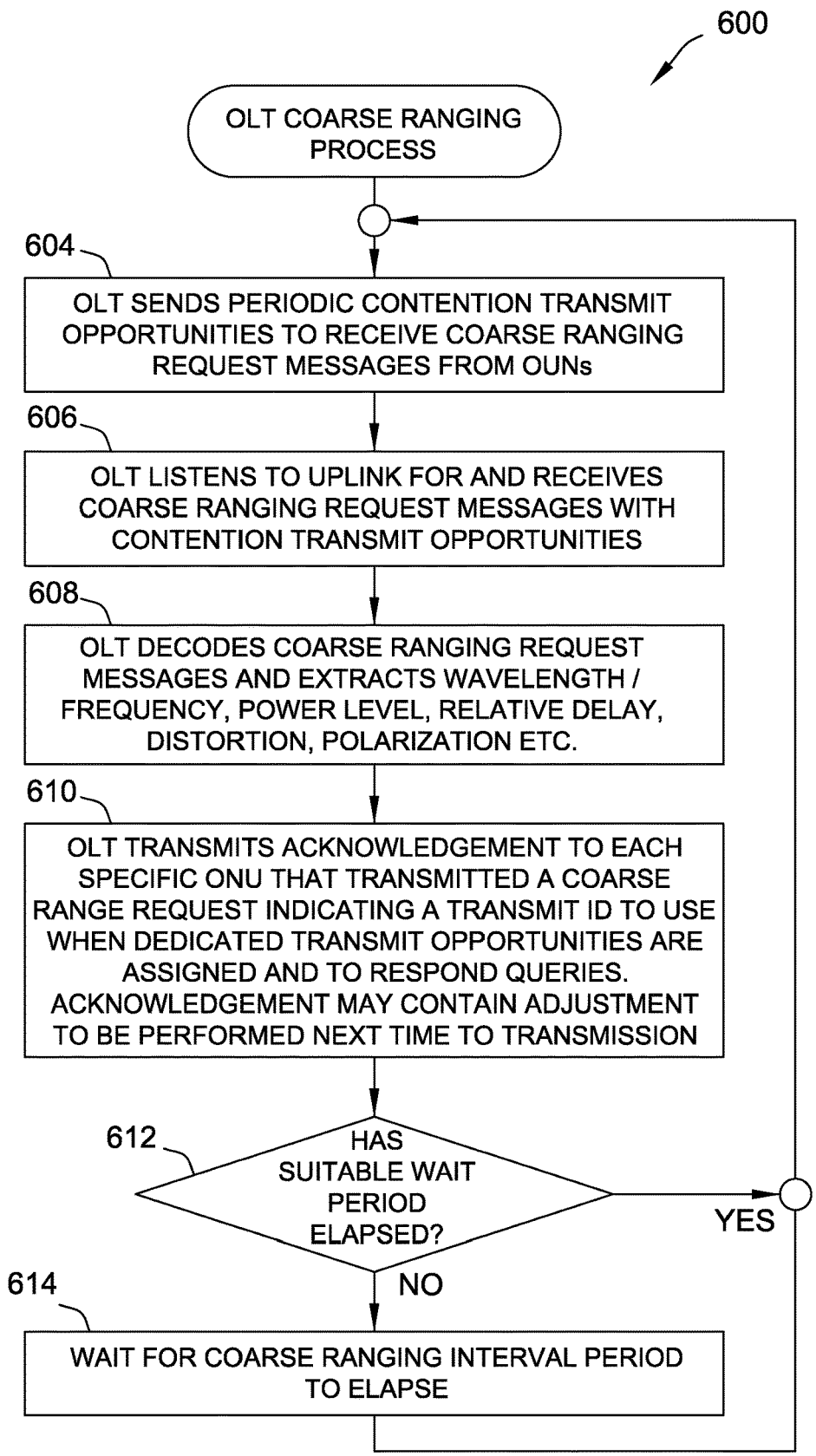
Figure 6B:
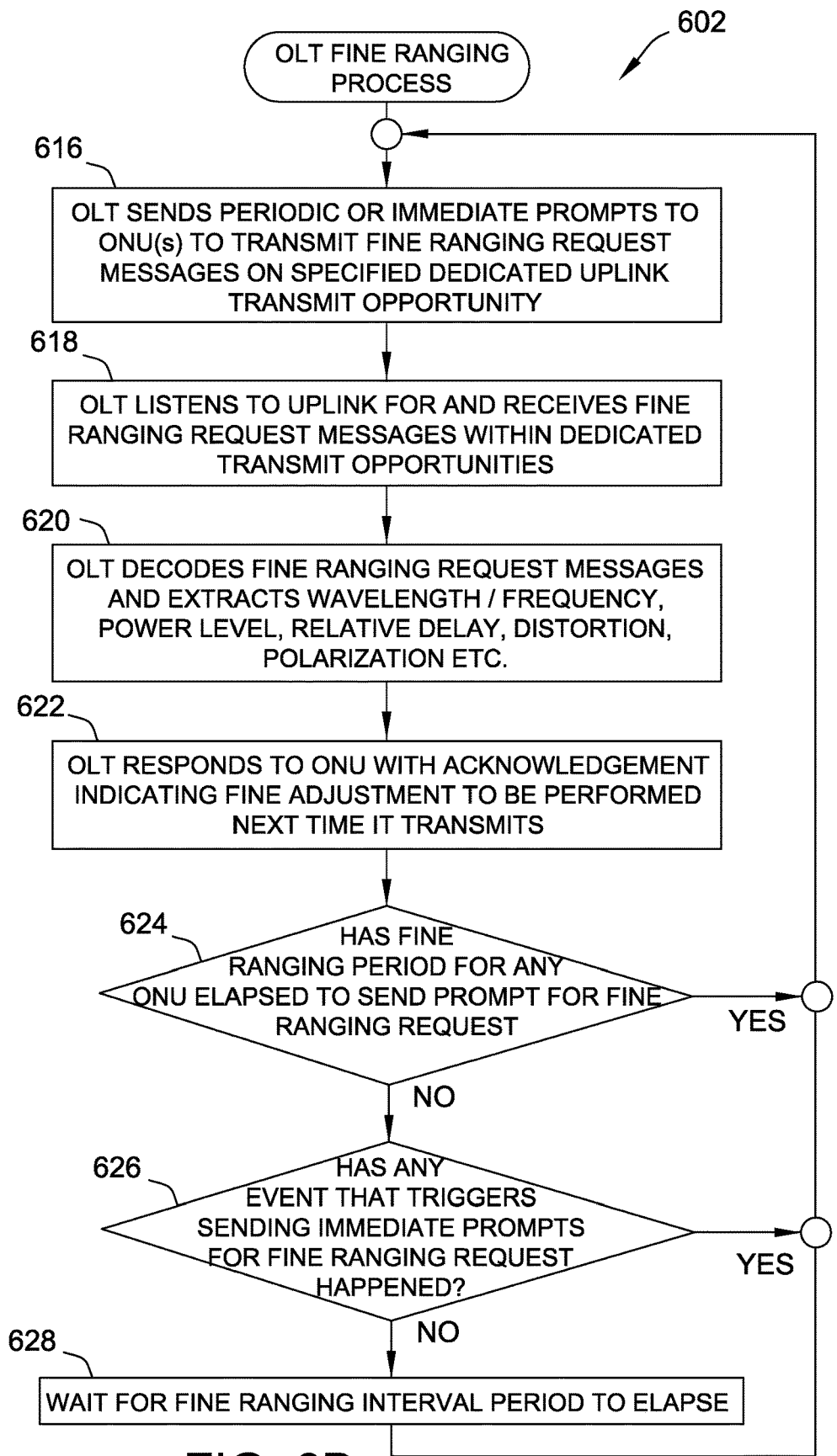

FIGS. 6A-B illustrate flow diagrams for a coarse optical line terminal ranging process and a fine optical line terminal ranging process, respectively, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As described herein, a "PON system" generally refers to a passive optical network system having components labeled according to known naming conventions of similar elements that are used in conventional PON systems. For example, an OLT may be implemented at an aggregation point and multiple ONUs may be disposed and operable at a plurality of subscriber locations. As described further below, the "uplink transmission" refers to the upstream PON transmission from the ONU to the OLT, and the "downlink transmission" refers to the PON downstream transmission from the OLT to the ONU, which is presumed to be broadcasting continuously, except, that is, in the case were the downlink operates in a different mode, such as a power saving mode, or another mode requiring a downstream silent period. The uplink transmission may be "bursty," or continuous if single wavelengths are assigned to individual uplink transmitters having a corresponding receiver is allocated in the OLT.

The following systems and methods herein describe optical network systems, components thereof, and one or more protocols for intelligently adjusting parameters within a coherent transceiver (or combination of separate receiver(s) and transmitter(s)). The present embodiments are thus able to advantageously provide key parameters needed for demodulation of the uplink receiver, thereby greatly simplifying the uplink receiver requirements to process the convergence time of the received signal(s). According to these innovative techniques, a significantly improved PON system is better able to manage transmission parameters for optimal transport and coexistence. These improvements over the conventional systems are particularly advantageous with respect to P2MP systems and methods.

In an exemplary embodiment, the advantageous techniques are described for adjusting parameters for ranging and transmission of the system. In this example, the upstream optical transmitter is presumed to be capable of controlling a variety of transport parameters, and that the upstream optical receiver is capable of sensing and assessing the value of one or more of such optical parameters, including without limitation, optical power level, frequency or wavelength, polarization, phase, delay, distortion, noise level, and other channel and/or terminal conditions. In the case where a fixed wavelength lasers are implemented, the following embodiments nevertheless consider how such fixed wavelength lasers are still capable of at least some range of wavelength control to keep an optical source wavelength stable and close to a desired value.

The present systems and methods further advantageously allow for a more flexible design of reference messages, such as ranging request messages, and in particular, the respective preambles of such messages. In the exemplary embodiment, the downlink transmission from the OLT is utilized to convey adjustment messages to the ONU transmitter, as described below in greater detail.

Figure 2:
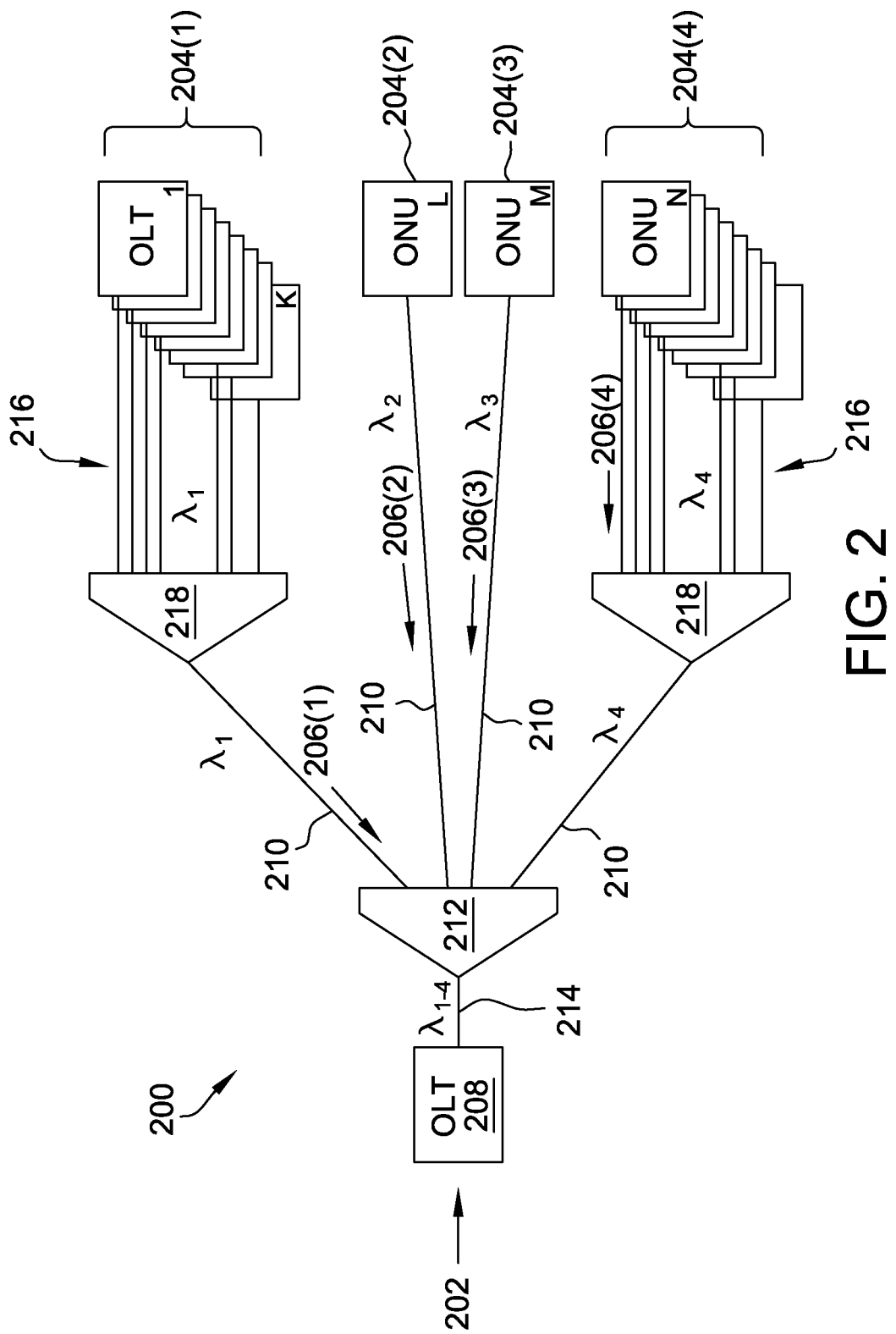
FIG. 2 is a schematic illustration depicting an exemplary upstream wavelength assignment distribution scheme for a passive optical network, in accordance with an embodiment.

FIG. 2 is a schematic illustration depicting an exemplary upstream wavelength assignment distribution scheme 200 for a PON 202. In the exemplary embodiment, PON 202 is a coherent optical network and includes a plurality of ONUs/ONU groups 204 transmitting respective optical wavelengths 206 (e.g., $\lambda_{1-4}$ in this example) to an individual OLT 208. Optical wavelengths 206 are transmitted from the respective ONU 204, over a plurality of short fibers 210, to a primary multiplexer/demultiplexer 212, which is configured to aggregate the plurality of optical wavelengths 206 for upstream transmission, over a long fiber 214, to OLT 208.

Figure 1:
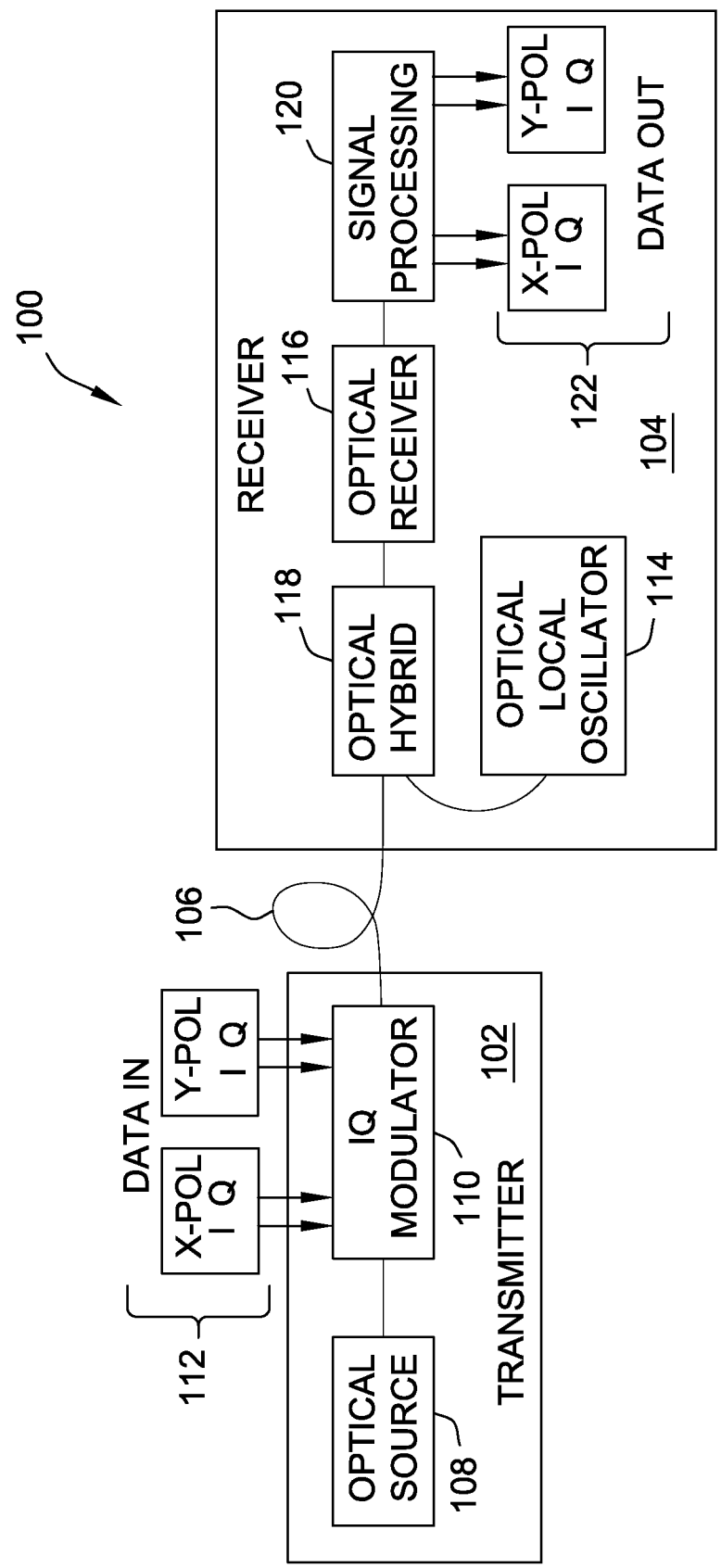
FIG. 1 is a schematic illustration of a conventional coherent optical link for a coherent optical network system.

OLT 208, for example, may include a downstream transmitter (not separately shown) having a similar architecture to coherent transmitter 102, FIG. 1, and an upstream receiver having a general architecture similar to coherent receiver 104, and may further include a separate processor and/or multiplexer/demultiplexer (not separately shown) between the downstream transmitter and upstream receiver. Similarly, each ONU 204 may include a comparable downstream receiver and upstream transmitter configured to communicate with their respective counterpart components in OLT 208. In the case where ONU 204 represents a group of ONUs (e.g., ONU 204(1) and ONU 204(4), in this example), the respective optical wavelengths 206 may be transmitted, over local fibers 216, to a respective secondary multiplexer/demultiplexer 218, for aggregation onto the respective short fiber 210. Multiplexers/demultiplexers 212, 218 may include, for example, optical combiners, splitters, wavelength multiplexers, wavelength demultiplexers, optical couplers, or combinations thereof.

In exemplary operation of scheme 200, OLT 208 represents an aggregation point for the plurality ONUs 204, which are disposed throughout a plurality of individual subscriber locations. As illustrated in FIG. 2, the uplink transmission of wavelengths 206 from an ONU group 204 (e.g., ONU 204(1) (including $ONU_1$ through $ONU_K$), ONU 204(4) (including $ONU_N$)) may represent a bursty transmission, whereas the uplink transmission of single wavelengths 206 from an individual assigned uplink transmitter (e.g., ONU 204(2) ("$ONU_L$") and ONU 204(3) ("$ONU_M$") may represent a continuous transmission. In some embodiments, wavelengths 206 are transmitted according to TDMA or dense wavelength division multiplexing (DWDM) coherent PON technology schemes. Exemplary coherent architectures are described in greater detail in U.S. Pat. No. 9,912,409 to Jia et al., co-pending U.S. patent application Ser. No. 15/590,464, filed May 9, 2017, and co-pending U.S. patent application Ser. No. 15/609,461, filed May 31, 2017, the disclosures of all of which are incorporated by reference herein.

In further operation of the exemplary architecture shown for PON 202, the downlink transmission may be available to respective downstream receivers (not shown) at each ONU 204, and without interruption for a significant amount of time. In this example, an initiation process may be implemented to set the interactions between OLT 208 and ONUs 204 on the same parameters. That is, the respective ONU receiver generally has time to determine the downstream parameters, and decode the necessary information corresponding to the uplink channels with which the downlink transmission is associated. Upon decoding a suitable downlink, the respective ONU 204 is able to obtain the uplink wavelength, and other transmit parameters, used to transmit information for wavelength 206. In the exemplary operation, a first transmission from ONU 204 may represent a ranging process or subprocess, described further below with respect to FIGS. 4-6, which may constitute a preliminary portion of the overall initialization process.

Figure 3:
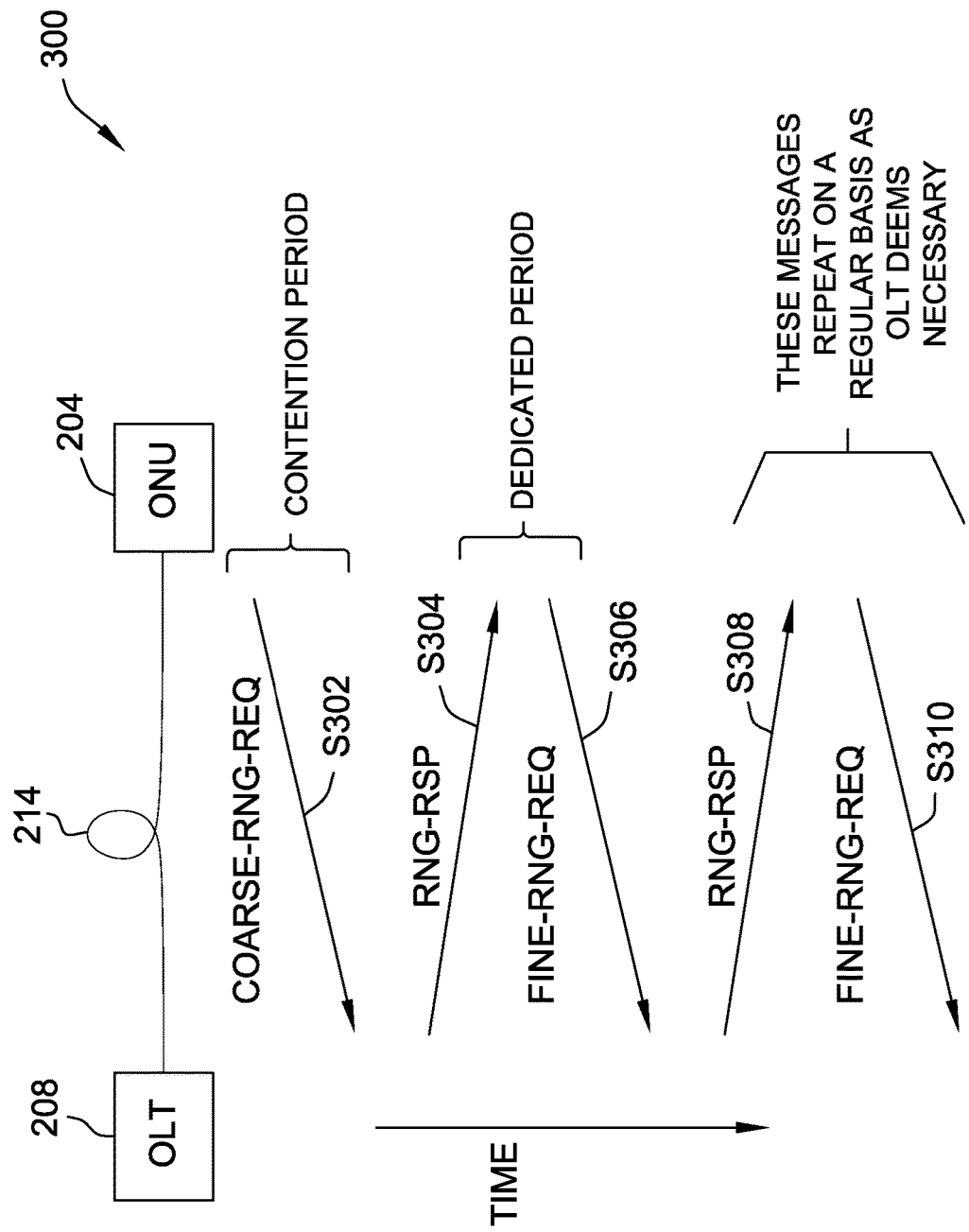
FIG. 3 depicts a sequence diagram for a coherent passive optical network ranging process, in accordance with an embodiment.

FIG. 3 depicts a sequence diagram for a coherent PON ranging process 300. In an exemplary embodiment, process 300 is implemented with respect to coherent PON 202, FIG. 2, including ONU 204, OLT 208, and fiber 214. Except where otherwise explained further below, the following steps may be performed in any order.

In exemplary operation, ranging process 300 begins at step 302, in which ONU 202 is configured to communicate with OLT 208 by transmitting a first reference message (e.g., Coarse Ranging Request Message, CRRM, or COARSE-RNG-REQ) over fiber 214. The CRRM may be configured such that OLT 208 may receive and decode the CRRM in a relatively straightforward manner. The CRRM thus facilitates OLT 208 to analyze the received signal, determine its characteristics, and assess "delta" adjustments to be conducted by the transmitter to have the transmitted signal meet the criteria of the corresponding low complexity receiver.

Since OLT 208 may not have knowledge as to which ONU 204 may need to access the communication system of PON 202, a contention period may be implemented to enable access from one or more of the ONUs 204. Accordingly, in the exemplary operation, the first CRRM may be subject to contention. In an embodiment, the CRRM utilizes QPSK symbols, such that symbol levels may be kept the same and more easily be used to adjust and calibrate the signal amplitude. In at least one embodiment, a portion of the CRRM is transmitted over a single polarization, which may advantageously enable faster convergence and demodulation of the message. In some cases, the message data rate may be smaller than the regular channel rate.

In further operation, at step 304, OLT 208 transmits a first ranging response message (e.g., first RRM, or RNG-RSP) to ONU 204 (i.e., over fiber 214). In an exemplary embodiment of step 304, the first RRM includes an acknowledgement of the CRRM, which may be confined to only limited information necessary to acknowledge receipt of the CRRM, together with information containing adjustments in delay, timing offset, distortion, noise level, frequency or wavelength, etc. Unless otherwise specified, further reference herein to the first RRM may be considered to refer to both the acknowledgement and the adjustment information of the message.

In step 306, after the first CRRM has been transmitted from ONU 204 to OLT 208, and the first RRM has been received with its return acknowledgement, together with a coarse adjustment in response thereto, a second reference message (e.g., finer adjustment request message, Fine Ranging Request Message, FRRM, or FINE-RNG-REQ) is transmitted from ONU 204 to OLT 208. In an exemplary embodiment of step 306, transmission of the FRRM assumes that the first CRRM was sufficiently understood (e.g., completely received and decoded) and assessed by OLT 208. In this example, the second adjustment request message, i.e., the FRRM, need not use a contention time period, and instead may transmit over a dedicated time period scheduled by OLT 204. In at least one embodiment, the FRRM may have a higher order modulation than QPSK.

In step 308, OLT 208 transmits a second RRM to ONU 204 as a response to the second FRRM. In an exemplary embodiment of step 308, second RRM is configured to enable and/or provide minor adjustments to parameters such as power level, wavelength/frequency offset, delay, distortion compensation (e.g., amount of chromatic dispersion), and other parameters. Step 310 is optional. In step 310, the second RRM is repeated. In at least some embodiments, step 310 is repeated periodically. In other embodiments, step 310 is repeated as needed, such as in response to a prompt or command by OLT 208.

In some embodiments of process 300, the initial CRRM is sent unsolicited by ONU 204 separately from the initialization process. In this example, such an unsolicited CRRM may occur upon passage of a certain time period, or after a particular event has been detected in the downstream signal, such as a potential wavelength drift or expected power level change. This unsolicited CRRM configuration is of particular use in the case where an ONU 204 is located in an outdoor and/or harsh environment, where such events are more likely to occur more often. In some cases, if a predetermined number (N) of fine adjustment fine ranging request message(s) (FRRM(s)) are not acknowledged (e.g., 2 or more sequential FRRM messages), ONU 204 may be configured to send an unsolicited CRRM to start the ranging process again. In this scenario, ONU 204 may assume that OLT 208 did not correctly assess the adjustment, and ONU 204 is thus configured to conduct another attempt at achieving the desired and/or necessary adjustment. Further to this example, the respective ONU transmitter may be configured to only transmit upstream payload messages (i.e., carrying subscriber traffic) after at least one second FRRM has been sent and acknowledged.

In further exemplary operation of process 300, after one or more this fine adjustment iterations, the receiver is enabled to advantageously receive upstream signals without requiring the relatively higher dynamic range required in conventional receivers, since, according to the present embodiments, the burst-by-burst signals are adjusted to arrive at the same power level. Furthermore, since the wavelengths of the successive bursts may be tuned at substantially similar frequencies, a receiver according to the present systems and methods is able to detect the bursts much more quickly than a receiver implementing conventional techniques.

In an exemplary embodiment, ONU 204 is configured to structure at least two preambles for the respective messages. A first preamble may relatively shorter, and may be dedicated for payload messages, and/or other messages that occur after the finer adjustment message. A second, relatively longer preamble may be used for the coarse adjustment and finer adjustment messages (CRRMs and FRRMs, respectively). The short preamble advantageously enables a more efficient time-packing of messages, and therefore also a lower overhead and greater capacity for the overall system. In some embodiments, the long preamble is used for the CRRM, and the shorter preamble for the subsequent FRRMs, and for other administration messages or for messages carrying subscriber payload that take place after coarse adjustment.

Process 300 is further advantageous over conventional techniques, and that process 300 is not exclusive to ONUs that are sharing a wavelength and/or time-multiplexing their own transmissions with other ONUs. Process 300 is further useful with respect to ONUs having a dedicated wavelength. More particularly, in the environment of PON 202, the present systems and methods are able to more precisely determine and control the respective optical transmission characteristics, thereby achieving significantly more efficient multiplexing, while addressing runaway optical carriers that may step on the band of another carrier. In the case where the ONU utilizes a dedicated wavelength, the corresponding OLT receiver is not expected to receive traffic from different uplink transmitters over the same wavelength, and the traffic received by the OLT may not be considered "bursty." Accordingly, in the dedicated uplink scenario, the present systems and methods may be configured such that the OLT receiver requirements may be relaxed. These dedicated wavelength uplink traffic embodiments are therefore of particular lists with respect to P2P systems.

In exemplary P2P coherent link embodiments, the present systems and methods may be further configured such that communication and feedback of parameters do not necessarily occur through an upper layer protocol, but are instead implemented through a manual process by which the parameters may be assessed by the respective receiver(s). In this example, through additional analysis techniques, an optimal configuration of process 300 may be obtained for still further adjustment of the transmitter/receiver/transceiver endpoints. In an alternative P2P link embodiment, an out-of-band (OOB)_channel is used to communicate feedback between transceivers, which may be implemented as part of the transceiver initialization or boot up process. In an alternative embodiment, the present systems and methods are implemented utilizing an automated process, in which a sub-layer is configured between the physical layer (PHY) and the media access control (MAC) layer such that the MAC layer need not be aware of the interactions between the end-point transceivers. According to this alternative technique, the present systems and methods are thus able to advantageously implement standard layer 2 protocols, such as Ethernet. In some embodiments, the present systems and methods implement an upper layer protocol as a subset of P2MP system, using the dedicated wavelength uplink.

In at least one embodiment of scheme 200 and process 300, and upstream coherent receiver at OLT 208 further includes an optical local oscillator (LO, not shown) that is configured to utilize a reference wavelength to which all upstream transmitters may be adjusted. Exemplary effects of such optical LO implementation are illustrated with respect to FIG. 4.

FIGS. 4A and 4B are graphical illustrations depicting a pre-adjustment effect 400 and a post-adjustment effect 402, respectively. As illustrated in FIGS. 4A, 4B, effects 400, 402 may each be applicable to one or both of scheme 200, FIG. 2, and process 300, FIG. 3. In the exemplary embodiment, pre-adjustment effect 400 and post-adjustment effect 402 depict respective power-vs-frequency graphical plots of an optical local oscillator signal 404 (e.g., of a local oscillator of the respective receiver) having a wavelength $\lambda_{LO}$, and a received optical signal 406 having a wavelength $\lambda_{SG}$. As depicted with respect to pre-adjustment effect 400, signal 404 has a power $P_{LO}$ and a frequency $f_{LO}$, and signal 406 has a pre-adjustment power $P_{SG}$ that is received at an initial receiver level, and a frequency $f_{SG}$.

As depicted though, with respect to post-adjustment effect 402 (e.g., after adjustment according to process 300, FIG. 3), local oscillator signal 404 maintains substantially the same wavelength $\lambda_{LO}$, power $P_{LO}$, and frequency $f_{LO}$, but the received signal 406' has been adjusted to wavelength $\lambda_{SG}'$, power $P_{SG}'$, frequency $f_{SG}'$. More particularly, after adjustment has occurred, $\lambda_{LO}$ is substantially equal to $\lambda_{SG}'$, $f_{LO}$ is substantially equal to $f_{SG}'$, and $P_{SG}'$ achieves a target receiver level.

In an exemplary embodiment, in pre-adjustment effect 400, it can be seen that, as the incoming frequency (e.g., $f_{SG}$) of the optical transmitter carrier signal (e.g., signal 406) is farther apart from the frequency (e.g., $f_{LO}$) of the local oscillator optical signal (e.g., signal 406), the resulting product may generate a relatively fast-changing signal. In contrast, as illustrated with respect to post-adjustment effect 402, when the two signals 404, 406' are relatively close in frequency (e.g., $f_{LO}=f_{SG}'$), the resulting product is a relatively slow-changing signal. This rate of change is also referred to as the frequency offset.

In some embodiments, the signal frequency or wavelength may be tuned using techniques to control the temperature of the associated laser diode. That is, in some cases, a laser diode of an optical system may be disposed on a temperature-controlling element such as a thermo-electric cooler (TEC). Using a TEC, for example, the temperature of the diode may be decreased when it is desirable to lower the wavelength or increase the frequency, or alternatively, the temperature may be increased when it is desirable to increase the wavelength or decrease the frequency. The present systems and methods are therefore further advantageous in that they may additionally utilize other laser-tuning mechanisms and/or conventional tunable lasers that enable greater wavelength tuning range.

In the exemplary embodiment, for both of the coarse and fine range request messages described above, the respective CRRMs and FRRMs may each have a "known" portion as well as an "unknown" portion of the respective message. For example, OLT 208 may use an ideal known message portion of the signal as the input signal, and the received known message portion of the signal (i.e., an output) may then be used to determine in an amount of channel distortion to which the input signal has been subjected. In the frequency domain, a product of the input signal and a transfer function describing the optical transmission channel may produce a resulting frequency domain representation of the output signal. To obtain equalization coefficients that compensate for channel distortion, the inverse of this transfer function (i.e., in the frequency domain) may then be obtained and applied to the input signal to inversely distort the signal and cancel the distortion of the channel. These back-to-back distortion processes thus function to cancel out results in an undistorted signal at the output.

The equalization coefficients describe the transfer function that generates the inverse distortion of the optical transmission channel. In the exemplary embodiment OLT 208 is configured to calculate these coefficients and send them to the respective ONU 204, such that the respective ONU 204 is enabled to predistort the upstream signal to arrive undistorted at OLT 208. In this exemplary embodiment, the RRM is used to convey the coefficients from OLT 208 to ONU 204.

In an exemplary embodiment, the several adjustment processes and subprocesses described above are implemented as a two-stage processes; (1) a first-stage of coarse adjustment process; and (2) a second-stage fine adjustment process. In the exemplary embodiment, the second-stage fine adjustment process may further be performed iteratively and/or periodically, thereby reducing the processing effort conducted by the respective upstream receiver, and further enabling a relaxation of the associated requirements of this receiver by providing a significantly faster demodulation process for burst-mode signal reception.

The innovative architecture of the message preambles, described above, further provides significantly improved efficiency for signal transmission. That is, according to the present systems and methods, the majority of the data transmission occurs after implementation of the coarse ranging process/subprocess. More particularly, the majority of transmissions represent fine ranging request messages and regular transmission of data (e.g., payload messages). The present embodiments therefore increase the overall transmission efficiency by utilizing a shorter preamble for the fine ranging request messages/regular payload data than for the CRRM. As described above, the innovative coarse ranging techniques enable the system to achieve significant signal adjustments from this initial request, and need only obtain relatively more minor adjustments in subsequent transmissions, namely, through the fine adjustment process. Accordingly, the majority of data transmission may be performed using these significantly shorter preambles, thereby increasing the overall system efficiency by significantly reducing the time utilized on preambles. These efficiency gains are advantageously realized whether a transmission is scheduled, or uses a dedicated transmit opportunity.

In some embodiments, a noise sensing subprocess and/or subsystem may be implemented in a complementary fashion with one or more of the systems and methods described above, such that the additional transmission leveraging may be realized in addition to that obtained through the innovative ranging processes described herein. Such additional techniques may be implemented without departing from the scope of the embodiments described above. For example, when implementing noise sensing, the present coarse/fine ranging process (described further below with respect to FIGS. 5 and 6) may still be utilized for communication between ONU 204 and OLT 208, and for adjusting particular parameters that may influence and/or reduce the noise level in the optical link thereof. The present systems and methods are primarily described herein with respect to a P2MP system, but the person of ordinary skill in the art, upon reading and comprehending the present application, will understand how the present embodiments are also applicable to a P2P system.

FIGS. 5A-5C illustrate a flow diagram for an ONU ranging process 500. Similar to process 300, FIG. 3, ranging process 500 may also be implemented with respect to the system architecture depicted in FIG. 2, including without limitation, coherent PON 202, as well as ONU 204, OLT 208, and fiber 214. Except where otherwise described to the contrary, one or more of the following steps may be performed in series, simultaneously, or in a different order.

In an exemplary embodiment, ONU ranging process 500 illustrates techniques similar to those described above with respect to the foregoing embodiments, and includes additional detail for a ranging operation from the perspective of a coherent optics ONU (e.g., ONU 204, FIG. 2). For example, where downstream synchronization occurs during initialization, some preliminary settings may be subject to change, such as the modulation format (e.g., from QPSK to 16QAM, where it is desirable to increase capacity for business users, etc.). And at least one embodiment, a handshaking subprocess may be implemented in addition to ONU ranging process 500, where such may be desirable for the downstream transmission as well.

ONU ranging process 500 begins at step 502, where the ONU scans the downlink channel. In an exemplary embodiment of step 502, process 500 verifies that the downlink is valid, and obtains the relevant uplink wavelength and related parameters. Process 500 then proceeds to execute separate subprocess 504. In an exemplary embodiment, subprocess 504 is executed in the case of an unsolicited ranging (e.g., an unsolicited CRRM is transmitted). Unsolicited ranging subprocess 504 begins at step 506, in which the ONU listens to the downlink channel for a contention transmit opportunity. In step 508, the ONU transmits in the next available transmit opportunity of the uplink. In an exemplary embodiment of step 508, the ONU transmits a CRRM using a QPSK modulation format. In the case where an unsolicited ranging is not desired, process 500 may alternatively proceed directly from step 502 to step 512.

In step 512, the ONU listens to the downlink for an acknowledgment of the CRRM (e.g., from step 510, in the case of an unsolicited CRRM). Step 514 is a decision step. In step 514, process 500 determines if a CRRM acknowledgment (e.g., and RRM) has been received. If, in step 514, process 500 determines that the CRRM acknowledgment/RRM was not received, process 500 returns to step 512. If, however, in step 514, process 500 determines that a RRM has been received, process 500 proceeds to step 516, in which the ONU reads the RRM for adjustments communicated from the OLT. In an exemplary embodiment of step 516, the RRM includes delta adjustments for the ONU transmitter, based on the OLT decoding and analysis of the CRRM (e.g., adjustments for one or more of wavelength, power level, distortion, delay, etc.). In step 518, the ONU configures its transmitter to make the adjustments read by the ONU in step 516. In at least one embodiment, steps 516 and 518 are performed together.

Step 520 is an optional step. In step 520, the ONU may be further configured to read a unique network identification provided by the OLT, such that the ONU is enabled to respond to a specific request from the OLT. In the case where optional step 520 is not implemented, process 500 may proceed from step 518 to step 522.

In step 522, the ONU listens to the downlink for a dedicated upstream transmit opportunity (e.g., for an FRRM). Step 524 is a decision step. In step 524, process 500 determines if an FRRM transmit opportunity has been received. If, in step 524, an FRRM has not been received, process 500 proceeds to decision step 526, in which process 500 determines if a suitable (e.g., predetermined) wait period has elapsed. If the suitable wait period has elapsed, process 500 returns to step 512. If, however, in step 526, process 500 determines that the determined wait period has not elapsed, process 500 returns to step 522. Referring back to decision step 524, if process 500 determines that an FRRM transmit opportunity has been received, process 500 proceeds to step 528.

In step 528, the ONU reads and configures its transmitter for desired fine adjustments (e.g., wavelength/frequency offset, power level, distortion compensation, delay, etc.) desired for an FRRM. In step 530, the ONU transmits, within a relevant dedicated uplink time, an FRRM (e.g., a first or subsequent FRRM). In step 532, the ONU listens to the downlink for an acknowledgment (e.g., RRM) of the transmitted FRRM. Step 534 is a decision step. In step 534, process 500 determines if an RRM was received in acknowledgment of the FRRM. If process 500 determines that the ONU has received the acknowledgment, process 500 proceeds to step 536, in which process 500 optionally performs one or more fine adjustments, as well as any desired additional subprocesses that may be enabled by the performance of the fine adjustments. In at least one embodiment of step 536, one or more of the additional subprocesses enables the ONU to respond to prompts from the OLT for fine ranging requests, such that the ONU maintains a "constant listening" operation. Process 500 then returns to step 532, where the ONU may be configured to listen to the downlink for additional FRRM acknowledgments.

Referring back to step 534, if no acknowledgment to the FRRM has been received, process 500 proceeds to decision step 538. In step 538, process 500 determines whether a suitable (e.g., predetermined) FRRM wait period has elapsed. If the FRRM wait period has not elapsed, process 500 returns to step 532. If, however, in step 538, the FRRM wait period as elapsed, process 500 proceeds to decision step 540. In step 540, process 500 determines whether more than a predetermined number N of FRRMs have been transmitted without acknowledgment/RRM from the OLT. If fewer than N FRRMs have been acknowledged, process 500 returns to step 522, and the ONU may listen to the downlink for the next dedicated transmit opportunity. If, however, N or more FRRMs have not been acknowledged, process 500 returns to step 508.

FIGS. 6A-B illustrate flow diagrams for a coarse OLT ranging process 600 and a fine OLT ranging process 602, respectively. Similar to ONU ranging process 500, FIG. 5, either or both of OLT ranging processes 600, 602 may also be implemented with respect to the system architecture depicted in FIG. 2, including without limitation, coherent PON 202, ONU 204, OLT 208, and fiber 214. Except where otherwise described, OLT ranging processes 600, 602, as well as the respective steps thereof, may be performed sequentially, simultaneously, or in a different order that may include one or more additional subprocesses that are not specifically illustrated. OLT ranging processes 600, 602 are not necessarily exclusive to ONU ranging process 500, and may indicate complementary processing operations seen from the OLT perspective.

OLT coarse ranging process 600 begins at step 604, in which the OLT sends an allocation lists or a map of a transmission indicating at least one contention transmit opportunity for a subsequent CRRM from the ONU. In an exemplary embodiment of step 604, the OLT periodically sends the allocation lists or maps of the transmission(s) indicating contention transmit opportunities for one (e.g., P2P) or more (e.g., P2MP) ONUs. In step 606, the OLT listens to the uplink for one or more CRRMs within the contention transmit opportunities. In an exemplary embodiment of step 606, the OLT receives at least one such CRRM. In step 608, the OLT decodes the CRRM(s) and extracts relevant data therefrom, including without limitation information regarding wavelength, frequency, power level, relative delay, distortion, etc.

In step 610, the OLT transmits an acknowledgment (e.g., RRM) to each ONU transmitting a CRRM. In an exemplary embodiment of step 610, the acknowledgment/RRM includes an indication of a transmit ID that is to be used by the ONU when dedicated transmit opportunities are assigned, and also to respond to queries. In at least one embodiment of step 610, the respective RRM further includes an adjustment to be performed in the next transmission. Step 612 is a decision step. In step 612, process 600 determines whether a suitable coarse ranging interval period (wait period) has elapsed. If the coarse wait period has elapsed, process 600 returns to step 604. If, however, in step 612, the coarse wait period has not elapsed, process 600 proceeds to step 614, in which the OLT waits for the coarse ranging interval period to elapse before returning to step 604.

OLT fine ranging process 600 begins at step 616, in which the OLT sends at least one periodic or immediate prompt to the ONU(s) to transmit an FRRM on a specified dedicated uplink transmit opportunity. In step 618, the OLT listens to the uplink for FRRMs within the dedicated transmit opportunities and receives one or more FRRMs. In step 620, the OLT decodes the FRRM(s) and extracts relevant data therefrom, including without limitation information regarding wavelength, frequency, power level, relative delay, distortion, etc. In step 622, the OLT responds to the ONU(s) with and acknowledgement (e.g., RRM) indicating at least one fine adjustment to be performed by the ONU in its next transmission.

Step 624 is a decision step. In step 624, process 602 determines whether a suitable fine ranging interval period has elapsed. In an exemplary embodiment of step 624, the OLT is configured to first send a prompt to the ONU for an FRRM before calculating the fine ranging interval period. If the fine ranging interval period has elapsed, process 602 returns to step 616. If, however, in step 624, the fine ranging interval period has not elapsed, process 602 proceeds to decision step 626, in which process 602 further determines whether a triggering event has occurred for the OLT to send an immediate FRRM prompt to the ONU. If process 602 determines that such a triggering event has occurred, process 600 returns to step 616. If, however, in step 626, process 602 does not detect the occurrence of a relevant triggering event, process 602 proceeds to step 628, in which the OLT waits for the find ranging interval period to elapse before returning to step 616.

The coherent systems and methods herein are of particular advantageous use for deployment in optical transmission systems, including NG-PON, 100G-EPON, and long distance fiber trunk links, as well as other coherent technologies in FTTP access networks, including optical metro and access networks, and in both brown-field and green-field deployments. The present techniques are applicable to digital coherent systems, and realize significant improvements with respect to digital signal processing (DSP), spectral efficiency (SE), data rate per channel, and receiver sensitivity, thereby advantageously allowing for an extended power budget.

The coherent detection techniques described herein further enable improved frequency selectivity through LO tuning capability, improved compensation for linear transmission impairments such as chromatic dispersion (CD) and polarization-mode dispersion (PMD) and more efficient utilization of spectral resources. According to these innovative embodiments, coherent communication systems are better able to take advantage of future network upgrades through the use of multi-level advanced modulation formats, and more easily migrate from long haul and metro networks, to data-center interconnect (DCI) and near-future access networks.

The present systems and methods thus realize the relaxed requirements of low complexity receivers in non-coherent systems, but without suffering from the limitations of such low complexity receivers, which are not scalable for coherent optic systems and/or modulation orders higher than QPSK. According to the present techniques, a coherent optic communication system is a significantly more tolerant of power and wavelength variations of transmitters in non-controlled or non-friendly environments (e.g., outdoors).

Exemplary embodiments of systems and methods for coherent optics ranging in sensing are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical network communication system utilizing a passive optical network (PON), comprising:
   an optical line terminal (OLT) having a downstream coherent transmitter and an upstream coherent receiver, the downstream transmitter configured to provide a coherent downlink transmission;
   a plurality of optical network units (ONUs), each ONU of the plurality of ONUs having a downstream coherent receiver and an upstream transmitter, wherein the downstream coherent receiver is configured to obtain one or more downstream parameters from the provided coherent downlink transmission; and
   a long fiber configured to carry the coherent downlink transmission between the OLT and a first ONU of the plurality of ONUs;
   wherein the first ONU is configured to communicate to the OLT a first upstream adjustment request message comprising a coarse ranging request message (CRRM),
   wherein the OLT is configured to communicate to the first ONU a first downstream acknowledgement in response to the upstream first adjustment request message,
   wherein the first ONU is configured to communicate to the OLT a second upstream adjustment request message based on the first downstream acknowledgement, wherein the second upstream adjustment request message comprises a fine ranging request message (FRRM),
   wherein the OLT is further configured to (i) receive the CRRM during a time corresponding to a detectable contention transmit opportunity within a contention window enabling access to the OLT by the plurality of ONUs, (ii) schedule a dedicated time window subsequent to the contention window, and (iii) receive the FRRM during the dedicated time window.

2. The system of claim 1, wherein the first ONU comprises an ONU group, wherein each ONU of the ONU group is respectively connected with at least one local fiber.

3. The system of claim 2, further comprising a local multiplexer for aggregating respective local fibers connected with the ONU group.

4. The system of claim 3, wherein the first ONU further comprises an individually-assigned ONU separate from the ONU group.

5. The system of claim 4, wherein the individually-assigned ONU is connected with a short fiber, and further comprising a remote multiplexer for aggregating the short fiber with the local multiplexer.

6. The system of claim 1, wherein the OLT is further configured to receive the CRRM as an unsolicited message outside of the contention window.

7. The system of claim 1, wherein the CRRM comprises quadrature phase shift keying (QPSK) modulation.

8. The system of claim 7, wherein the FRRM comprises a modulation order higher than QPSK.

9. The system of claim 8, wherein the modulation order is 16QAM or higher.

10. The system of claim 1, wherein the first downstream acknowledgement comprises first adjustment instructions having one or more primary adjustments for the upstream transmitter to make to an uplink transmission from the first ONU to the OLT.

11. The system of claim 10, wherein the one or more primary adjustments includes a change to at least one of an amplitude, a frequency, a wavelength, a delay, a distortion compensation, and a frequency offset of the uplink transmission.

12. The system of claim 10, wherein the OLT is further configured to communicate to the first ONU a second downstream acknowledgement in response to the second upstream adjustment request message, and wherein the first ONU is further configured to make one or more secondary adjustments to the uplink transmission based on second adjustment instructions included with the second downstream acknowledgement.

13. The system of claim 12, wherein the first ONU is further configured to (i) repeat the FRRM periodically, or (ii) transmit the FRRM in response to one of a prompt and a command from the OLT.

14. The system of claim 1, wherein the CRRM includes a first preamble having a first preamble length, and wherein the FRRM includes a second preamble having a second preamble length shorter than the first preamble length.

15. The system of claim 1, wherein the CRRM and the FRRM include a first preamble having a first preamble length, and wherein payload messages transmitted after the FRRM include a second preamble having a second preamble length shorter than the first preamble length.

16. A method of ranging by a first optical network unit (ONU) of a plurality of ONUs in a coherent passive optical network (PON), comprising the steps of:
   scanning the PON for a valid downlink channel from an optical line terminal (OLT) in operable communication with each ONU of the plurality of ONUs;
   detecting a contention transmit opportunity from the valid downlink channel;
   transmitting a first coarse ranging request message CRRM to the OLT during a contention time window of the contention transmit opportunity;
   receiving a first acknowledgement message from the OLT in response to the first CRRM;
   modifying an uplink transmission based on first adjustment instructions included with the received first acknowledgement message;
   sending a first fine ranging request message FRRM to the OLT during a dedicated time interval window indicated with the received first acknowledgement message; and
   adjusting the uplink transmission based on second adjustment instructions included with a second acknowledgement message received from the OLT in response to the first FRRM.

17. A method of ranging by a first optical network unit (ONU) of a plurality of ONUs in a coherent passive optical network (PON), comprising the steps of:
   scanning the PON for a valid downlink channel from an optical line terminal (OLT) in operable communication with each ONU of the plurality of ONUs;
   detecting a contention transmit opportunity from the valid downlink channel;
   transmitting a first coarse ranging request message CRRM to the OLT during a contention time window of the contention transmit opportunity;
   receiving a first acknowledgement message from the OLT in response to the first CRRM;
   modifying an uplink transmission based on first adjustment instructions included with the received first acknowledgement message;
   sending a first fine ranging request message FRRM to the OLT during a dedicated time interval indicated with the received first acknowledgement message;
   adjusting the uplink transmission based on second adjustment instructions included with a second acknowledgement message received from the OLT in response to the first FRRM;

sending a second FRRM one or more times;
waiting a predetermined time interval after each sent second fine adjustment request message;
determining that a predetermined number of second FRRMs have not been acknowledged by the OLT; and
transmitting a second CRRM to the OLT based on the step of determining.

* * * * *